United States Patent
Aksyuk et al.

(10) Patent No.: US 7,068,409 B2
(45) Date of Patent: Jun. 27, 2006

(54) TIP-TILT-PISTON ACTUATOR

(75) Inventors: Vladimir Anatolyevich Aksyuk, Piscataway, NJ (US); Maria Elina Simon, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/813,951

(22) Filed: Mar. 31, 2004

(65) Prior Publication Data

US 2005/0219675 A1 Oct. 6, 2005

(51) Int. Cl.
*G02B 26/08* (2006.01)

(52) U.S. Cl. .................................................. 359/224

(58) Field of Classification Search ........ 359/223–226, 359/290, 291
See application file for complete search history.

(56) References Cited

U.S. PATENT DOCUMENTS 5,535,047 A * 7/1996 Hornbeck .................. 359/295
6,480,320 B1 11/2002 Nasiri ........................ 359/291
2001/0048265 A1 * 12/2001 Miller et al. ................ 310/309

* cited by examiner

*Primary Examiner*—Euncha P. Cherry
(74) *Attorney, Agent, or Firm*—Eugene J. Rosenthal

(57) ABSTRACT

A freely rotatable micromechanical plate is achieved by employing at least three rotatable plates that are each suspended from a substrate via respective springs, and are coupled via other respective springs to at least three moveable plate attachment points, so that rotation of the rotatable plates about an axis transfers motion to the moveable plate attachment points. Respective posts couple the movement of each respective moveable plate attachment point to a moveable plate. In operation, the rotatable plates may be individually rotated, and the resulting motion of each rotatable plate is passed to its respective moveable plate attachment point. The combined motion of the moveable plate attachment points is passed to the moveable plate via the posts. Using proper control, the plate may be made to tip, tilt and piston. Advantageously, the piston motion may achieve a high vertical movement frequency response.

15 Claims, 4 Drawing Sheets

TIP-TILT-PISTON ACTUATOR

TECHNICAL FIELD

This invention relates to Micro-Electro-Mechanical-Systems (MEMS), and more particularly, to plates that can controllably tip, tilt, and piston.

BACKGROUND OF THE INVENTION

U.S. Pat. No. 6,480,320 issued to Nasiri on Nov. 12, 2002, discloses a freely rotatable micromechanical mirror. While allowing free rotation, such a design is not especially suitable to intentionally directed linear motion in the direction normal to the surface of the substrate from which the mirror is offset, i.e., piston.

SUMMARY OF THE INVENTION

We have recognized that a freely rotatable micromechanical plate, e.g., a mirror, that is especially suitable to fast linear motion in the direction normal to the surface of the substrate from which the mirror is offset, combined with tip and tilt motion, can be achieved, in accordance with the principles of the invention, by employing at least three rotatable plates that are each suspended from a substrate via respective springs, and are coupled via other respective springs to at least three moveable plate attachment points, so that rotation of the rotatable plates about an axis transfers motion to the moveable plate attachment points. Respective posts couple the movement of each respective moveable plate attachment point to a moveable plate. In operation, the rotatable plates may be individually rotated, and the resulting motion of each rotatable plate is passed to its respective moveable plate attachment point. The combined motion of the moveable plate attachment points is passed to the moveable plate via the posts. Using proper control, the plate may be made to tip, tilt and piston. Advantageously, the piston motion may achieve a high vertical movement frequency response.

The various springs are some form of deformable elastic element, and they need not all be the same. For example, a spring could be a relatively thin beam, or it could be a folded set of beams. A spring that connects a rotatable plate to the substrate may be along an edge of the rotatable plate and act as the axis of rotation for the plate.

The rotation of the plates may be actuated in any conventional manner, including a) having at least one electrode below the plate, b) using another plate coupled to the rotatable plate to exert a force on the rotatable plate, e.g., by having an electrode under the other plate, so that angle amplification may be achieved, and/or c) by using a so-called "comb drive".

DETAILED DESCRIPTION

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

The term micro-electromechanical systems (MEMS) device as used herein is intended to mean an entire MEMS device or any portion thereof. Thus, if a portion of a MEMS device is inoperative, or if a portion of a MEMS device is occluded, such a MEMS device is nonetheless considered to be a MEMS device for purposes of the present disclosure.

In the description, identically numbered components within different ones of the FIGs. refer to the same components.

Figure 1:
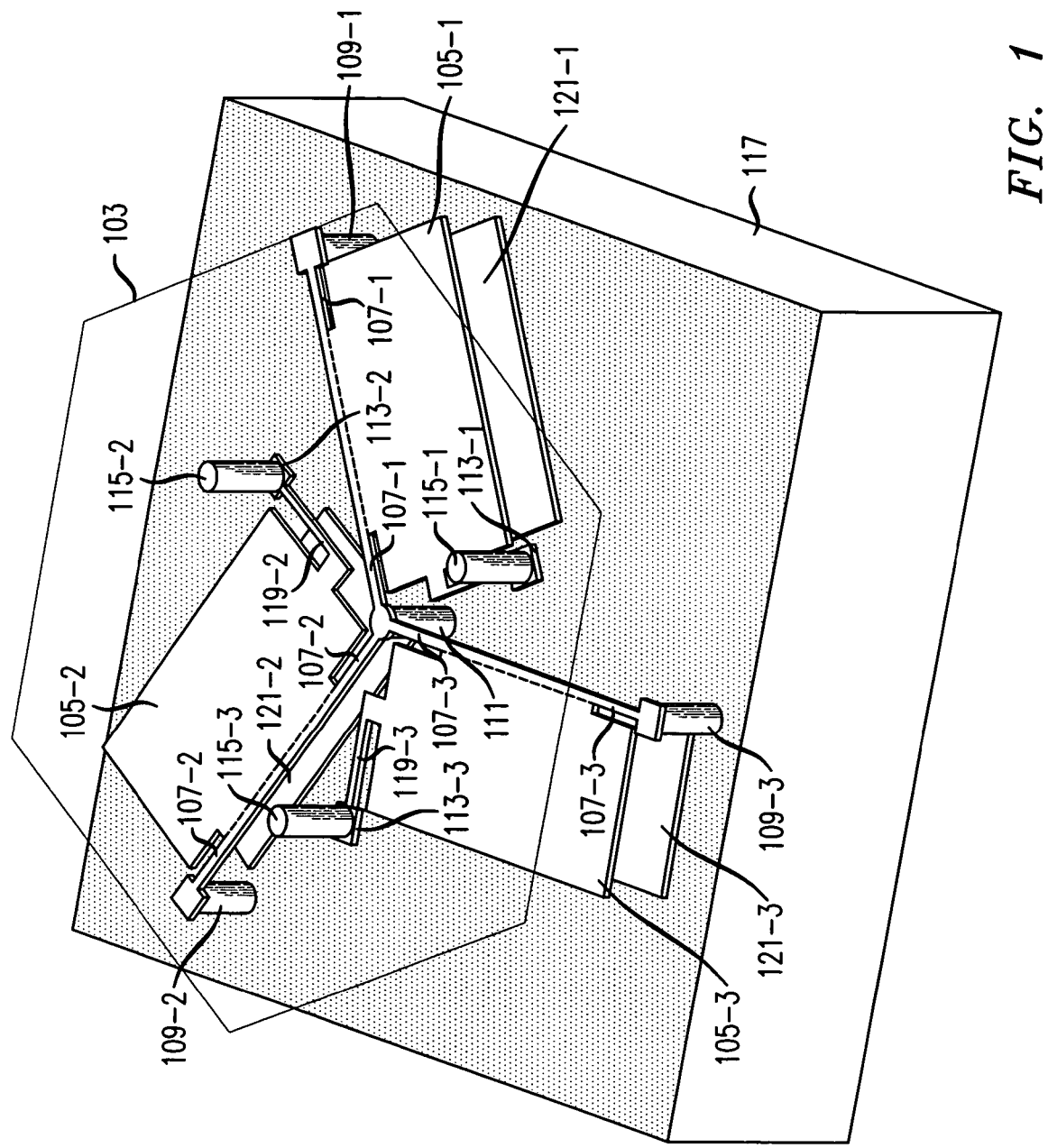
FIG. 1 shows a freely rotatable micromechanical plate, e.g., a mirror, that is especially suitable to fast linear motion in the direction normal to the surface of the substrate from which the mirror is offset, combined with tip and tilt motion, in accordance with the principles of the invention.

FIG. 1 shows a freely rotatable micromechanical plate, e.g., a mirror, that is especially suitable to fast linear motion in the direction normal to the surface of the substrate from which the mirror is offset combined with tip and tilt motion, i.e., piston, in accordance with the principles of the invention. Shown in FIG. 1 are a) moveable plate 103; b) rotatable plates 105, including rotatable plates 105-1 through 105-3; c) first springs 107, including first springs 107-1 through 107-3; d) posts 109, including posts 109-1 through 109-3; e) center post 111; f) moveable plate attachment points 113, including points 113-1 through 113-3; g) movement coupling posts 15, including posts 115-1 through 115-3, h) substrate 117, and i) second springs 119, including second springs 119-1 through 119-3.

Each of rotatable plates 105 is suspended via one of first springs 107, which are each respectively, in turn coupled to substrate 117 by an associated one of posts 109 and center post 111. Rotatable plates 105 each rotates about an axis substantially defined by the one of first springs 107 to which it is coupled.

Moveable plate attachment points 113 are each coupled to a respective one of rotatable plates 105 via a respective associated one of second springs 119 so that rotation of rotatable plates 105 about their respective axis of rotation transfers motion to the associated respective one of moveable plate attachment points 113.

Each of movement coupling posts 115 couples the movement of its associated respective one of moveable plate attachment points 113 to moveable plate 103.

In operation, rotatable plates 105 may be individually rotated, and the resulting motion of each rotatable plate 105 is passed to its respective associated moveable plate attachment point 113. The combined motion of moveable plate attachment points 113 is passed to moveable plate 103 via posts 115.

Using proper control, moveable plate 103 may be made to tip, tilt and piston. Advantageously, the piston motion may achieve a high frequency response as the arrangement of the springs and plates can be made stiff for the vertical motion, with respect to the substrate, while being soft for rotational, i.e., tip-tilt, motion. This is because the stiffness of the vertical motion depends on parameters of the springs that can be chosen independent of the parameters of the springs that govern the torsional movement. More specifically, the vertical motion is governed by the bending stiffnesses of the first and second springs, while rotational motion is governed by the torsional stiffnesses of the first and second springs.

Moveable plate 103 nay be metal, or metal coated, so that it may act as a mirror. Alternatively, any other optical element may be attached to moveable plate 103. Moreover, moveable plate 103 need not be flat. It need only be a rigid structure that is rigidly coupled to moveable plate attachment points 113.

Also shown in FIG. 1 are electrodes 121, including electrodes 121-1 through 121-3, which are used to cause rotatable plates 105 to rotate about their respective axis of rotation.

Figure 2:
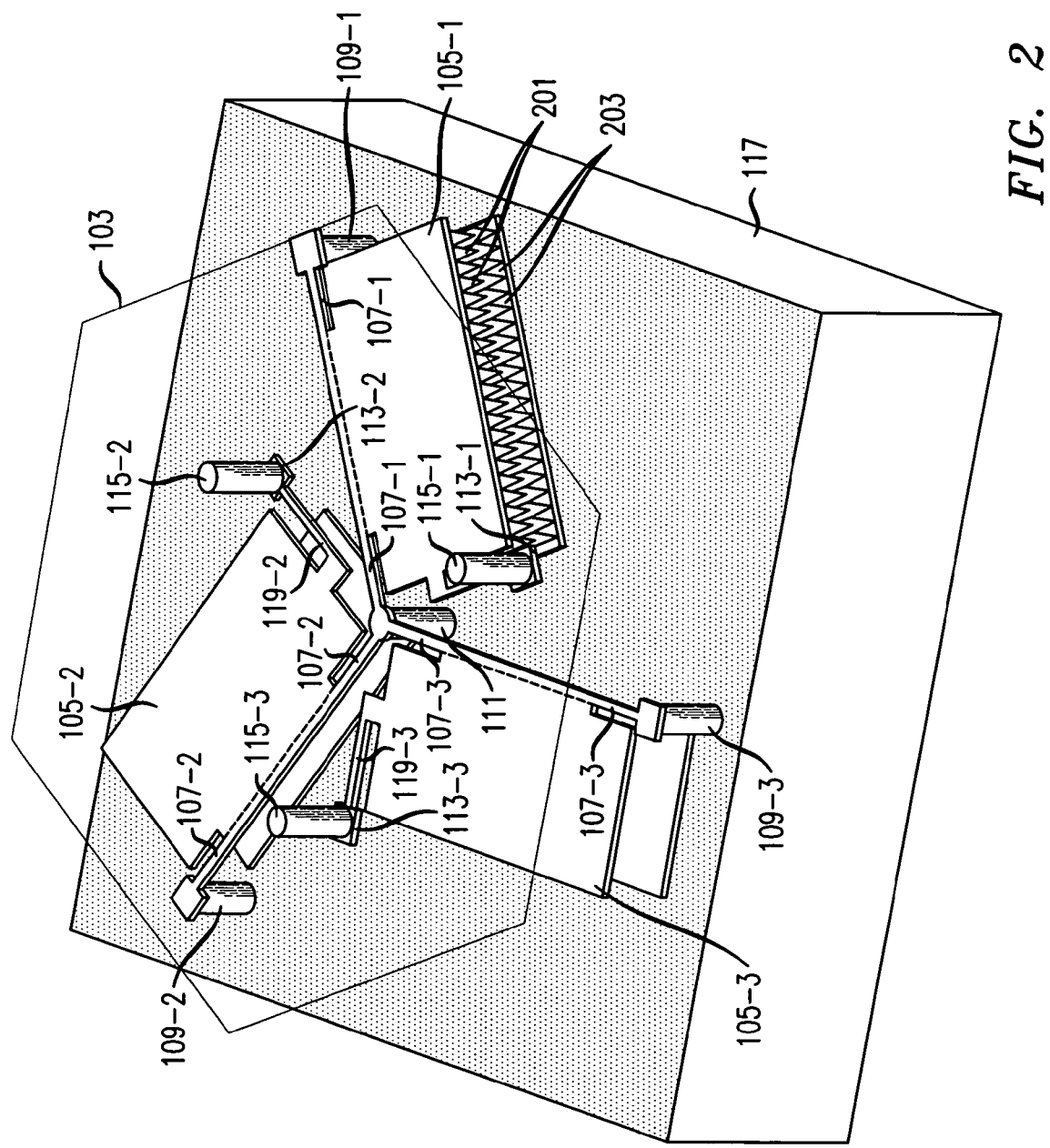
FIG. 2 shows another arrangement, in accordance with the principles of the invention, of a freely rotatable micromechanical plate, similar to the one in FIG. 1, but in which the basic drive has been replaced with a so-called "comb drive"

FIG. 2 shows another arrangement, in accordance with the principles of the invention, of a freely rotatable micromechanical plate that is similar to the one shown in FIG. 1, but in which the basic drive by at least electrode 121-1 has been replaced with a so-called "comb drive". More specifically, shown in FIG. 2 are a) upper comb teeth 201-1, which are coupled to rotatable plate 105-1, and b) lower comb teeth 203-1, which are coupled to substrate 117. Advantageously, a higher force density can be achieved using such a comb drive. Note that the particular drives of rotatable plates 105-2 and 105-3 cannot be seen in FIG. 2, and that they may, but need not, also be comb drives. When using a comb drive, rotatable plates 105 may be reduced in size considerably, e.g., so that it is just big enough to hold all the combs rigidly. The effect is that the reduced size plate is considered a vestigial plate.

Figure 3:
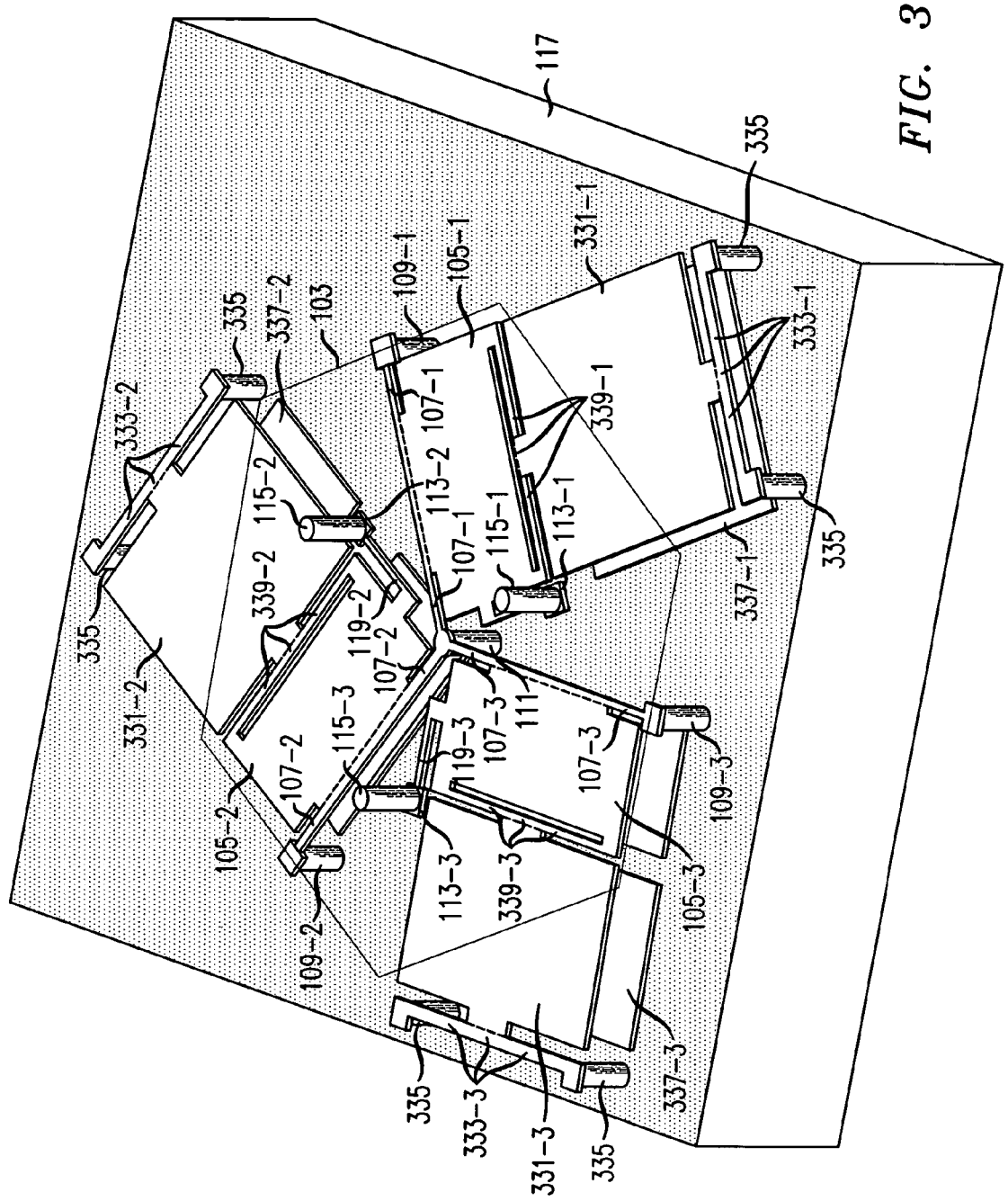
FIG. 3 shows another arrangement, in accordance with the principles of the invention, of a freely rotatable micromechanical plate, similar to the one shown in FIG. 1, but in which the basic drive has been replaced with using another plate coupled to the rotatable plate to exert a force on the rotatable plate, so that angle amplification may be achieved.

FIG. 3 shows another arrangement, in accordance with the principles of the invention, of a freely rotatable micromechanical plate that is similar to the one shown in FIG. 1, but in which the basic drive by at least electrode 121-1 has been replaced with using another plate coupled to the rotatable plate to exert a force on the rotatable plate, e.g., by having an electrode under the other plate, so that angle amplification may be achieved. More specifically, shown in FIG. 3, in addition to the elements of FIG. 1 are 1)drive plates 331, including drive plate 331-1 through 331-3, 2) drive springs 333, including springs 333-1 through 333-3, 3) drive support posts 335, and 4) electrodes 337, including electrodes 337-1 through 337-3.

Each of drive plates 331 is coupled to a respective associated one of rotatable plates 105, so that the coupled edges cannot displace vertically with respect to each other but they can rotate with respect to each other. Such a coupling may be achieved in various ways, such as through the use of center coupling spring 339. Alternative arrangements, such as the use of coupling springs nearer the edges may be employed. Also, each of drive plates 331 is supported via its associated respective one of drive springs 333, which are in turn coupled to substrate 117 via their respective ones of drive support posts 335. Each of electrodes 337, is located below its associated respective one of drive plates 331.

When supplied with a voltage with respect to its associated drive plate 331, each electrode 337 causes its associated one of drive plates 331 to rotate about the axis formed by its associated drive spring 333. In turn, as the edge of one of drive plates 331 opposite its associated one of drive springs 331 descends, the associated one of rotatable plate 105 is forced to descend with it. Advantageously, angle amplification is achieved when a one of drive plates 331 is longer than its associated one of rotatable plates 105.

To increase the force exerted in rotating rotatable plate 105 further than is possible when using angle amplification alone, electrodes, such as electrode 121-1, may also be placed under one or more of rotatable plates 105. Moreover, comb drives may be employed to replace any electrodes, whether under one of drive plates 331 or one of rotatable plates 105, in the same manner that a comb drive was substituted in FIG. 2 for electrode 121-1 of FIG. 1.

Figure 4:
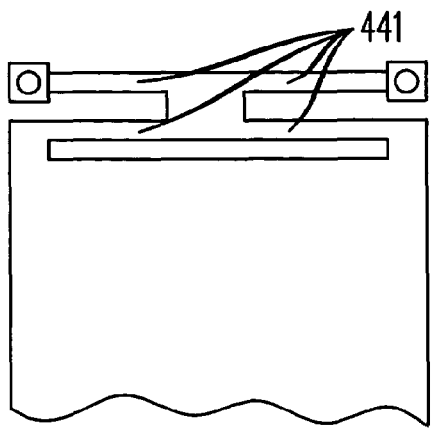
FIG. 4 shows an arrangement for use in an embodiment of the invention in which at least one of the first springs for coupling one of the rotatable plates to the substrate is a folded beam.

FIG. 4 shows an arrangement for use in an embodiment of the invention in which at least one of first springs 107 for coupling one of rotatable plate 105 to substrate 117 is folded beam 441. Such springs are conventionally employed in MEMS devices.

Figure 5:
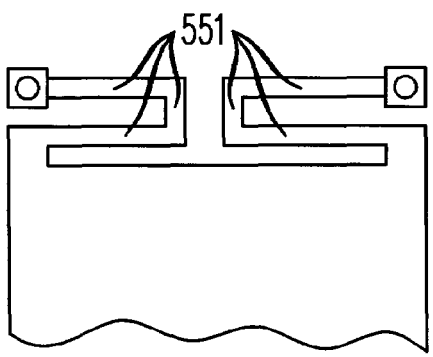
FIG. 5 shows another arrangement for use in an embodiment of the invention in which at least one of the first springs for coupling one of the rotatable plates to the substrate is a folded beam.

Similarly, FIG. 5 shows another arrangement for use in an embodiment of the invention in which at least one of first springs 107 for coupling one of rotatable plate 105 to substrate 117 is folded beam 551. As noted, such springs are conventionally employed in MEMS devices.

Figure 6:
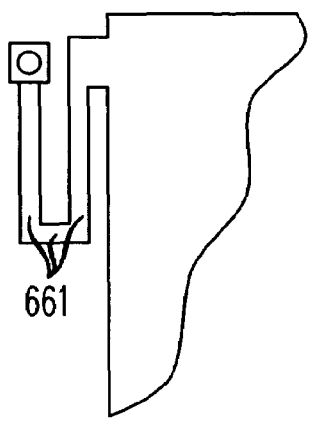
FIG. 6 shows an arrangement for use in an embodiment of the invention in which at least one of the second springs which couples one of rotatable plates to one of the moveable plate attachment points is a folded beam.

FIG. 6 shows an arrangement for use in an embodiment of the invention in which at least one of second springs 119 which couples one of rotatable plates 105 to one of moveable plate attachment points 113 is folded beam 661. Again, such springs are conventionally employed in MEMS devices.

What is claimed is:

1. A freely rotatable micromechanical plate apparatus, comprising:
   at least three rotatable plates, each of said rotatable plates being suspended from a substrate via a respective first spring;
   a moveable plate;
   at least three moveable plate attachment points, each of said moveable plate attachment points being coupled to a respective one of said rotatable plates via respective ones of second springs so that rotation of each of said rotatable plates about a respective axis transfers motion to the moveable plate attachment points; and
   at least three posts, each of said posts coupling the movement of each of a respective one of said moveable plate attachment points to said moveable plate.

2. The invention as defined in claim 1 wherein said moveable plate is a mirror.

3. The invention as defined in claim 1 wherein said springs are deformable elastic elements.

4. The invention as defined in claim 1 wherein at least one of said springs is a relatively thin beam.

5. The invention as defined in claim 1 wherein at least one of said springs is a folded set of beams.

6. The invention as defined in claim 1 wherein at least one of said first springs is located along an edge of its associated rotatable plate and acts as the axis of rotation therefore.

7. The invention as defined in claim 1 further comprising at least one electrode located below at least on of said rotatable plates.

8. The invention as defined in claim 1 further comprising an additional plate, said additional plate being coupled to at least one of said rotatable plates and being adapted to rotate said rotatable plate.

9. The invention as defined in claim 8 wherein said additional plate is coupled to said rotatable plate by at least one spring.

10. The invention as defined in claim 8 wherein said additional plate is adapted to rotate said rotatable plate using angle amplification.

11. The invention as defined in claim 8 further comprising at least one electrode operable to move said additional plate.

12. The invention as defined in claim 8 further comprising at least a comb drive operable to move said additional plate.

13. The invention as defined in claim 1 wherein at least one of said rotatable plates incorporates fingers that are part of a comb drive.

14. The invention as defined in claim 1 wherein at least one of said rotatable plates is a vestigial rotatable plate.

15. A method for making a freely rotatable micromechanical plate apparatus, comprising:
    suspending from a substrate via a respective one of a first set of springs each of at least three rotatable plates;
    coupling each of at least three moveable plate attachment points to a respective one of said rotatable plates via respective ones of a second set springs so that rotation of each of said rotatable plates about a respective axis transfers motion to the moveable plate attachment points; and
    coupling a moveable plate to each of said moveable plate attachment points via a respective one of least three posts, each of said posts coupling the movement of each of a respective one of said moveable plate attachment points to said moveable plate.

* * * * *